(12) United States Patent
Kato (10) Patent No.: US 6,775,026 B1
(45) Date of Patent: Aug. 10, 2004

(54) INTERNET FACSIMILE SYSTEM CAPABLE OF DATA COMMUNICATION OVER THE INTERNET

(75) Inventor: Tokunori Kato, Ichinomiya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 890 days.

(21) Appl. No.: 09/671,589

(22) Filed: Sep. 28, 2000

(30) Foreign Application Priority Data

Sep. 29, 1999 (JP) ............................ P11-275986

(51) Int. Cl.⁷ ............................ G06F 15/00; H04N 1/00; H04Q 7/20
(52) U.S. Cl. ................... 358/1.15; 358/440; 455/445
(58) Field of Search ............................ 358/1.15, 440, 358/402; 455/412.1, 445, 466; 379/9.01, 93.25, 100.08; 714/43; 345/752; 725/43; 709/204, 206, 207

(56) References Cited

U.S. PATENT DOCUMENTS 6,061,502 A * 5/2000 Ho et al. .................. 358/1.15
6,424,828 B1 * 7/2002 Collins et al. ............ 455/412.1

FOREIGN PATENT DOCUMENTS

| JP | 9-247334 | 9/1997 |
| JP | 9-252393 | 9/1997 |
| JP | 10-4206 | 1/1998 |

* cited by examiner

*Primary Examiner*—Mark Wallerson
*Assistant Examiner*—Thomas J Lett
(74) *Attorney, Agent, or Firm*—Oliff & Berridge PLC (57) ABSTRACT

An Internet communication system includes a target register, an Internet command unit, a judgment unit, a target candidate display unit, and a selection unit. The target register is registered with e-mail addresses and URLs as targets of data communication over the Internet. The Internet command unit commands data communication over the Internet. When the Internet command unit commands data communication, then the judgment unit judges whether data is to be transmitted to one of the e-mail addresses registered in the target register, or home page data located at one of the URLs registered in the target register is to be downloaded and received. When the judgment unit judges that data is to be transmitted to one of the e-mail addresses, then the target candidate display unit extracts only e-mail addresses from the target register and displays a list of the extracted e-mail addresses as target candidates. On the other hand, when the judgment unit judges that home page data located at one of the URLs is to be downloaded and received, then the target candidate display unit extracts only URLs from the target register and displays a list of the extracted URLs as target candidates. The selection unit selects a desired e-mail address or URL from the displayed target candidates.

6 Claims, 8 Drawing Sheets

INTERNET FACSIMILE SYSTEM CAPABLE OF DATA COMMUNICATION OVER THE INTERNET

BACKGROUND OF THE INVENTION

1. Field of the Invention

The present invention relates to an Internet communication system.

2. Description of the Related Art

The Internet has become widely used. Typically, Internet communication systems include a function for inputting a Uniform Resource Locator (URL) to connect to a desired home page located at a site on the World Wide Web (referred to as WWW, or just "the Web," hereinafter), and downloading home page data from the home page.

Japanese Patent-application Publication Nos. HEI-9-252393, HEI-9-247334, and HEI-10-4206 disclose Internet facsimile communication systems for receiving and transmitting facsimile data over the Internet.

SUMMARY OF THE INVENTION

It is desirable to have an Internet facsimile communication system capable of both transmitting and receiving facsimile data over the Internet, and also capable of downloading and receiving home page data from a particular Web site. Although such an Internet facsimile communication system is conceivable, no such system has been developed.

One potential problem with such a system lays in the need to store both e-mail addresses and URLs in an electronic address book of the system. That is, the e-mail addresses and the URLs would be mixed together, and would also be displayed in this mixed together condition when the address book is displayed for selecting an e-mail address or a URL from the address book. This would make operations for selecting an e-mail address or a URL troublesome, and would produce a situation ripe for making mistakes.

It is an objective of the present invention to provide an Internet communication system capable of receiving and transmitting e-mail and facsimile data over the Internet, and also capable of downloading home page data from Web sites. It is another objective of the present invention to enable using this system to easily select e-mail addresses and URLs as targets of data communication.

In order to achieve these objectives, the present invention is an Internet communication system for communicating data over the Internet, wherein the Internet communication system includes a target register, an Internet command unit, a judgment unit, a target candidate display unit, and a selection unit.

The target register is registered with e-mail addresses and URLs as targets of data communication over the Internet.

The Internet command unit commands data communication over the Internet.

When the Internet command unit commands data communication over the Internet, then the judgment unit judges whether data is to be transmitted to one of the e-mail addresses registered in the target register, or home page data located at one of the URLs registered in the target register is to be downloaded and received.

When the judgment unit judges that data is to be transmitted to one of the e-mail addresses registered in the target register, then the target candidate display unit extracts only e-mail addresses from the target register and displays a list of the extracted e-mail addresses as target candidates. On the other hand, when the judgment unit judges that home page data located at one of the URLs registered in the target register is to be downloaded and received, then the target candidate display unit extracts only URLs from the target register and displays a list of the extracted URLs as target candidates.

The selection unit selects a desired e-mail address or URL from the displayed target candidates.

According to another aspect of the present invention the Internet communication system includes a target register registered with e-mail addresses and URLs as targets of data communication over the Internet; an e-mail command unit that commands transmission of data to one of the e-mail addresses registered in the target register; a homepage data download command unit that commands downloading and reception of home page data located at one of the URLs registered in the target register; a target candidate display unit that extracts only e-mail addresses from the target register and displays a list of the extracted e-mail addresses as target candidates when the e-mail command unit commands transmission of data to one of the e-mail addresses registered in the target register, and extracts only URLs from the target register and displays a list of the extracted URLs as target candidates when the homepage data download command unit commands downloading and reception of home page data located at one of the URLs registered in the target register; and a selection unit that selects a desired e-mail address or URL from the displayed target candidates.

BRIEF DESCRIPTION OF THE DRAWINGS

The above and other objects, features and advantages of the invention will become more apparent from reading the following description of the embodiment taken in connection with the accompanying drawings in which.

DETAILED DESCRIPTION OF THE EMBODIMENT

Next, an Internet facsimile communication system 1 according to an embodiment of the present invention will be provided while referring to the attached drawings.

Figure 1:
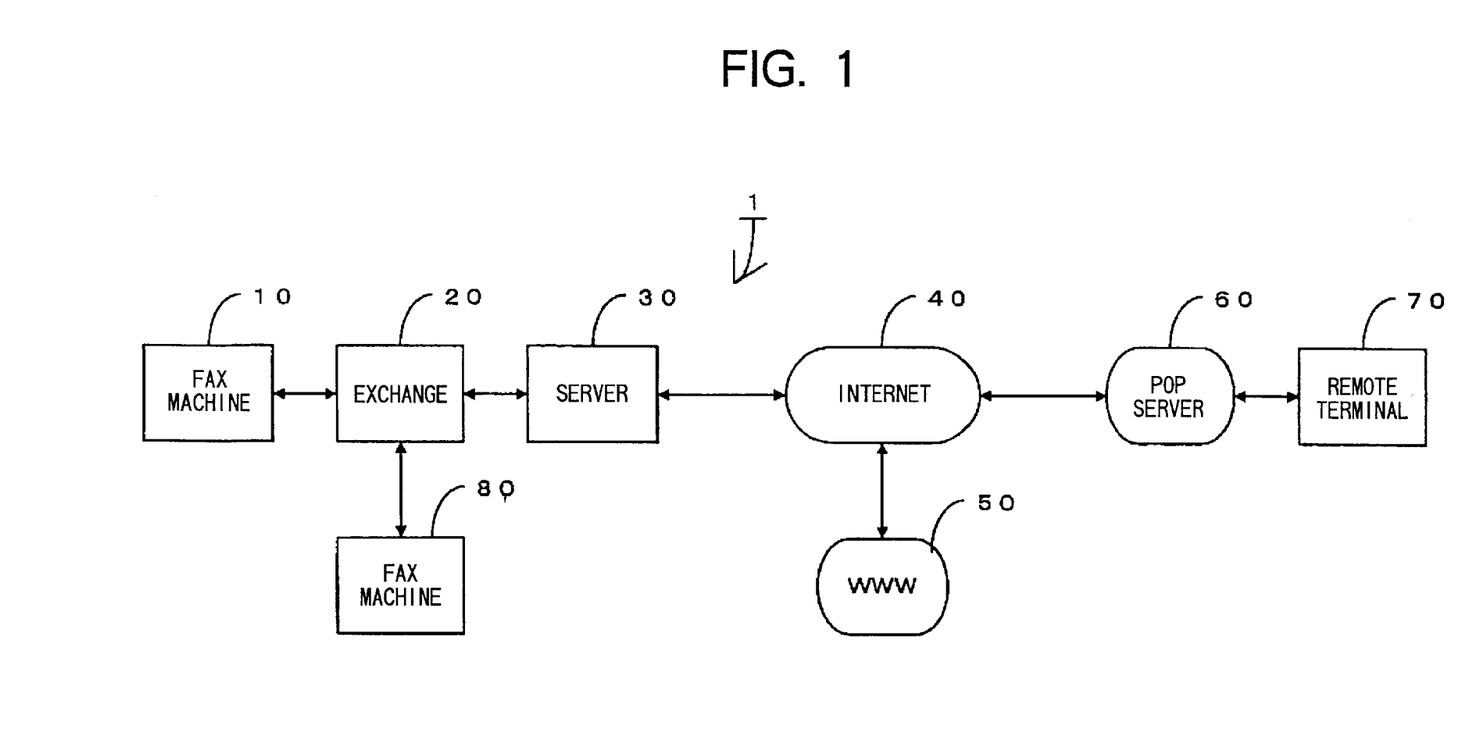
FIG. 1 is a block diagram schematically showing an Internet facsimile communication system according to an embodiment of the present invention.

As shown in FIG. 1, the Internet facsimile communication system 1 includes a fax machine 10, an exchange 20 connected by a public line to the fax machine 10, a server 30 connected by a public line to the exchange 20, the Internet 40 connected to the server 30, a world wide web (WWW) server 50 connected to the Internet 40, a Post Office Protocol (POP) server 60 connected to the Internet 40, a remote terminal 70 connected to the POP server 60, and a fax machine 80 connected by a public line to exchange 20.

As will be described in more detail later, the fax machines 10, 80 can transmit a user-selected e-mail address and G3 data of a document to the server 30. When the server 30 receives these from the fax machine 10, the server 30 converts the G3 data into data with an e-mail format and transmits the e-mail-format data to the e-mail address. The fax machines 10, 80 can also transmit a URL that corresponds to a web site of the WWW server 50 to the server 30 When the server 30 receives such a URL, the server 30 connects to the WWW server 50, downloads and receives home page data from the WWW server 50, converts the home page data into G3 data, and transmits the G3 data to the facsimile terminal in a call back operation.

Figure 2:
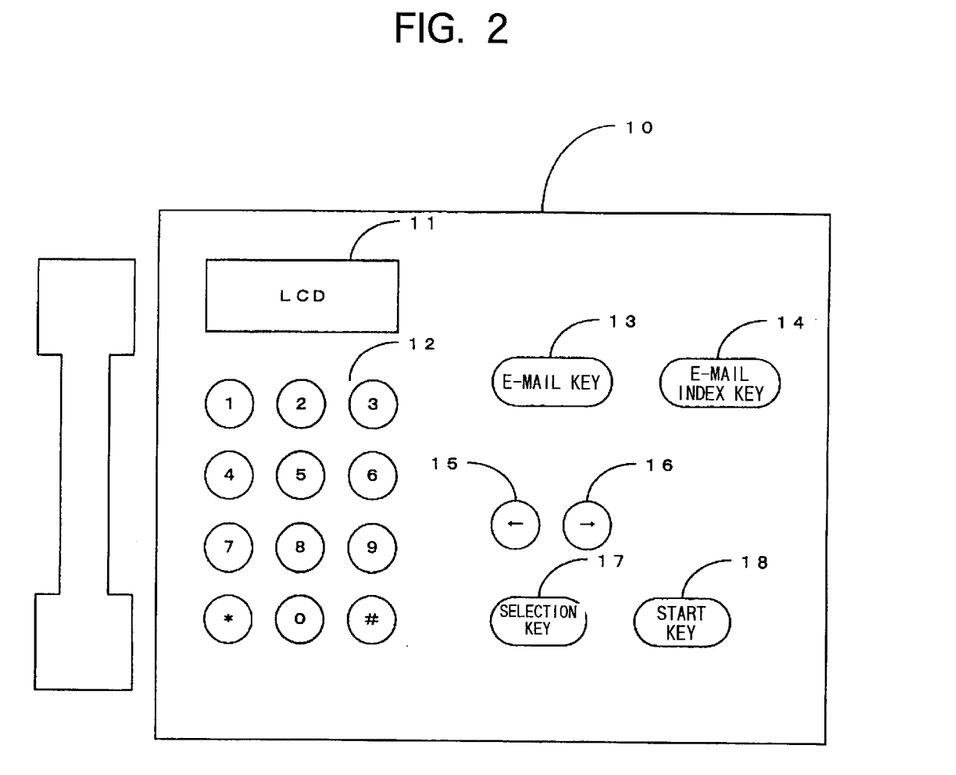
FIG. 2 is a plan view showing a fax machine of the system shown in FIG. 1.

As shown in FIG. 2, the fax machine 10 includes an liquid crystal display (LCD) 11, a numeric pad 12, an e-mail key 13, an e-mail index key 14, scroll keys 15, 16, a section key 17, and a start key 18. The e-mail key 13 when pressed indicates that the user wants to use the fax machine 10 to transmit one or the other of e-mail data or facsimile data across the Internet 40. The e-mail index key 14 is pressed to display e-mail addresses and WEB URLs on the LCD 11. The scroll keys 15, 16 are pressed to scroll through the e-mail addresses and URLs that are displayed on the LCD 11 because the e-mail index key 14 was pressed. The selection key 17 is for selecting a desired one of the e-mail addresses and URLs displayed on the LCD 11. The start key 18 is for commanding transmission of e-mail or facsimile data from the fax machine 10 across the Internet or downloading of desired WEB home page data from across the Internet.

Figure 3:
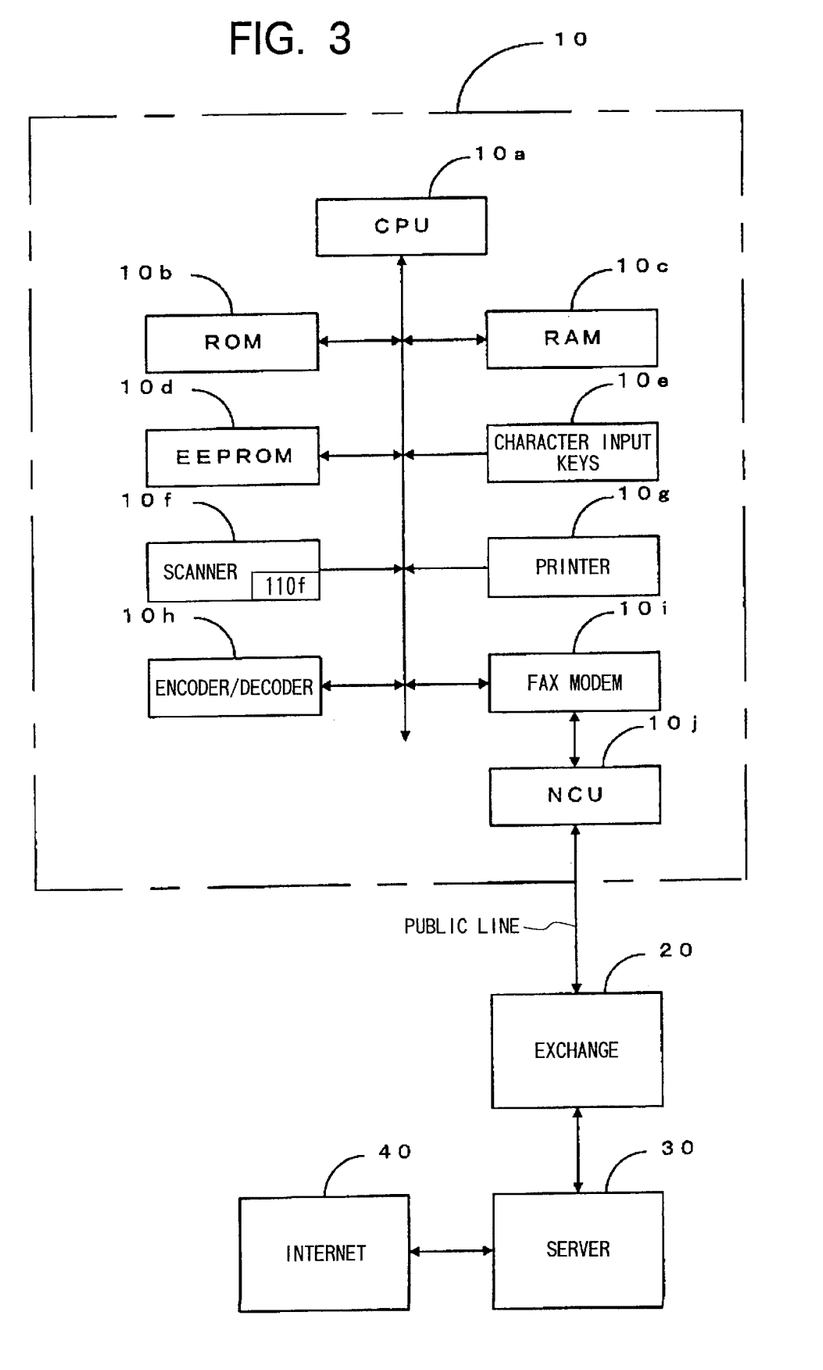
FIG. 3 is a block diagram schematically showing electrical configuration of the fax machine of FIG. 2.

As shown in FIG. 3, the fax machine 10 includes a central processing unit (CPU) 10a, a read only memory (ROM) 10b, a random access memory (RAM) 10c, an EEPROM 10d, character input keys 10e, a scanner 10f with a document sensor 110f, a printer 10g, an encoder/decoder 10h, a fax modem 10i, and an network control unit (NCU) 10j. The CPU 10a executes overall control of the-fax machine 10. The ROM 10b prestores control programs executed by the CPU 10a. The RAM 10c functions as an image memory during reception and transmission of facsimile data when the CPU 10a executes control processes. The RAM 10c also stores e-mail data inputted from the character input keys 10e and functions as a work area for various control processes. The EEPROM 10d stores fax numbers, e-mail addresses, and WEB URLs.

The character input keys 10e are provided for performing input of e-mail text when transmit e-mail from the fax machine 10 over the Internet. In the present embodiment the numeric key pad 12 serves as the character input keys 10e. That is, the keys of the numeric key pad 12 are each allotted with different characters, numbers, and symbols. For example, the "1" key is allotted with the Japanese characters ア, イ, ウ, エ, and オ, the alphabetic characters A, a, B, b, C, and c, and the number 1, the "2" key is allotted with the Japanese characters カ, キ, クケ, and コ, the alphabetic characters D, d, E, e, F, and f, and the number 2, and the "#" key is allotted with the @ mark and other symbols.

The scanner 10f is provided for retrieving an image of a document to transmit as facsimile data from the fax machine 10. The printer 10g is for printing out received WEB home page data and facsimile data onto a recording sheet. The encoder/decoder 10h is for converting image data retrieved by the scanner 10f into G3 compression format, and for converting data received in G3 compression format into image data that can be printed out by the printer 10g. The fax modem 10i is for transmitting and receiving e-mail data and facsimile date over the public line. The NCU 10j is for executing communication control when transmitting or receiving facsimile data.

Figure 4:
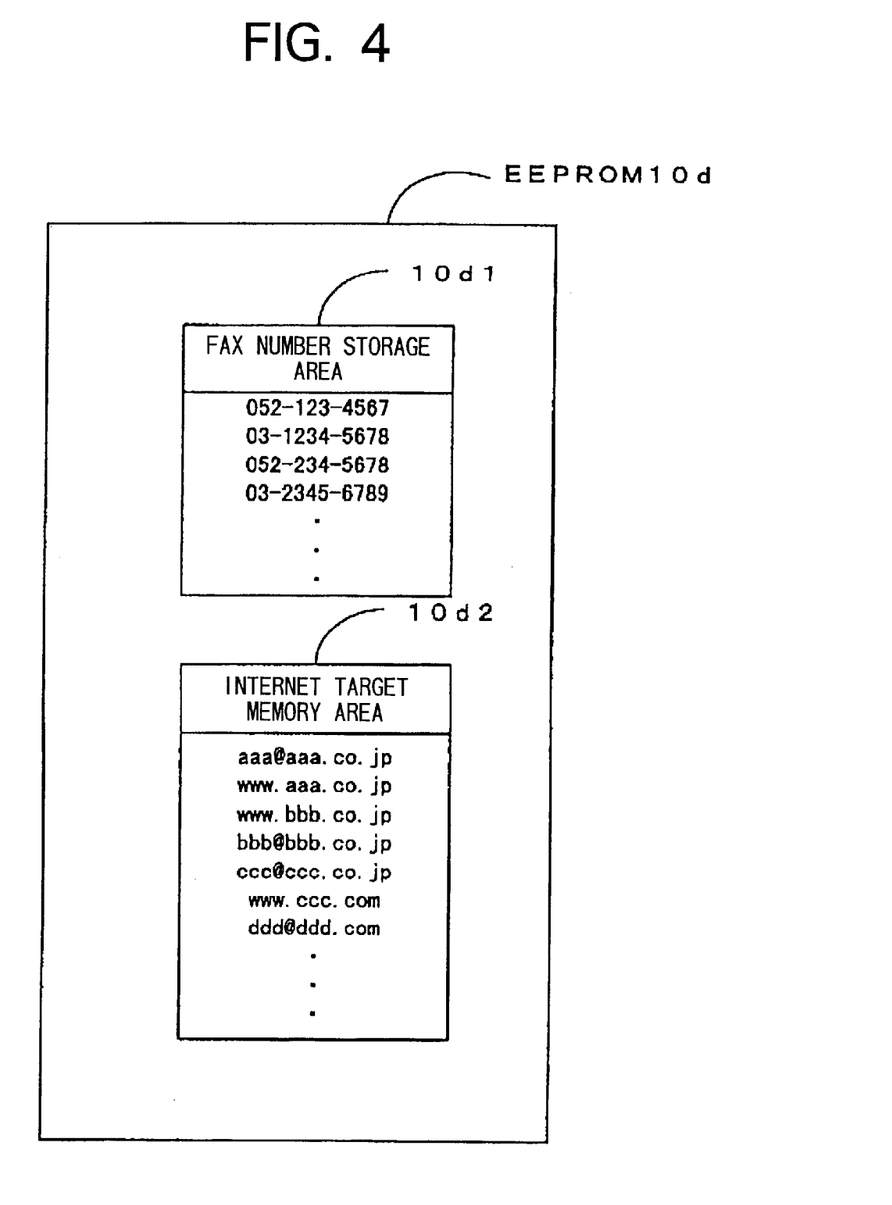
FIG. 4 is schematic view representing content of an EEPROM of the fax machine of FIG. 2.

As shown in FIG. 4, the EEPROM 10d includes a fax number storage area 10d1 for storing fax numbers and an Internet target memory area 10d2 for storing e-mail addresses and URLS. Fax numbers inputted by the user using the numeric pad 12 are stored in the fax number storage area 10d1, and e-mail addresses and URLs inputted by the user using the numeric pad 12 are stored in the Internet target memory area 10d2. As shown in FIG. 4, the Internet target memory area 10d2 stores the e-mail addresses and the URLs randomly in a mixed arrangement.

Next, an Internet communication control routine performed by the Internet facsimile communication system 1 according to the present embodiment will be explained while referring to FIGS. 5 to 8. During the Internet communication control routine, the Internet facsimile communication system 1 transmits facsimile data and e-mail and downloads data of a desired WEB home page, both over the Internet.

Figure 5:
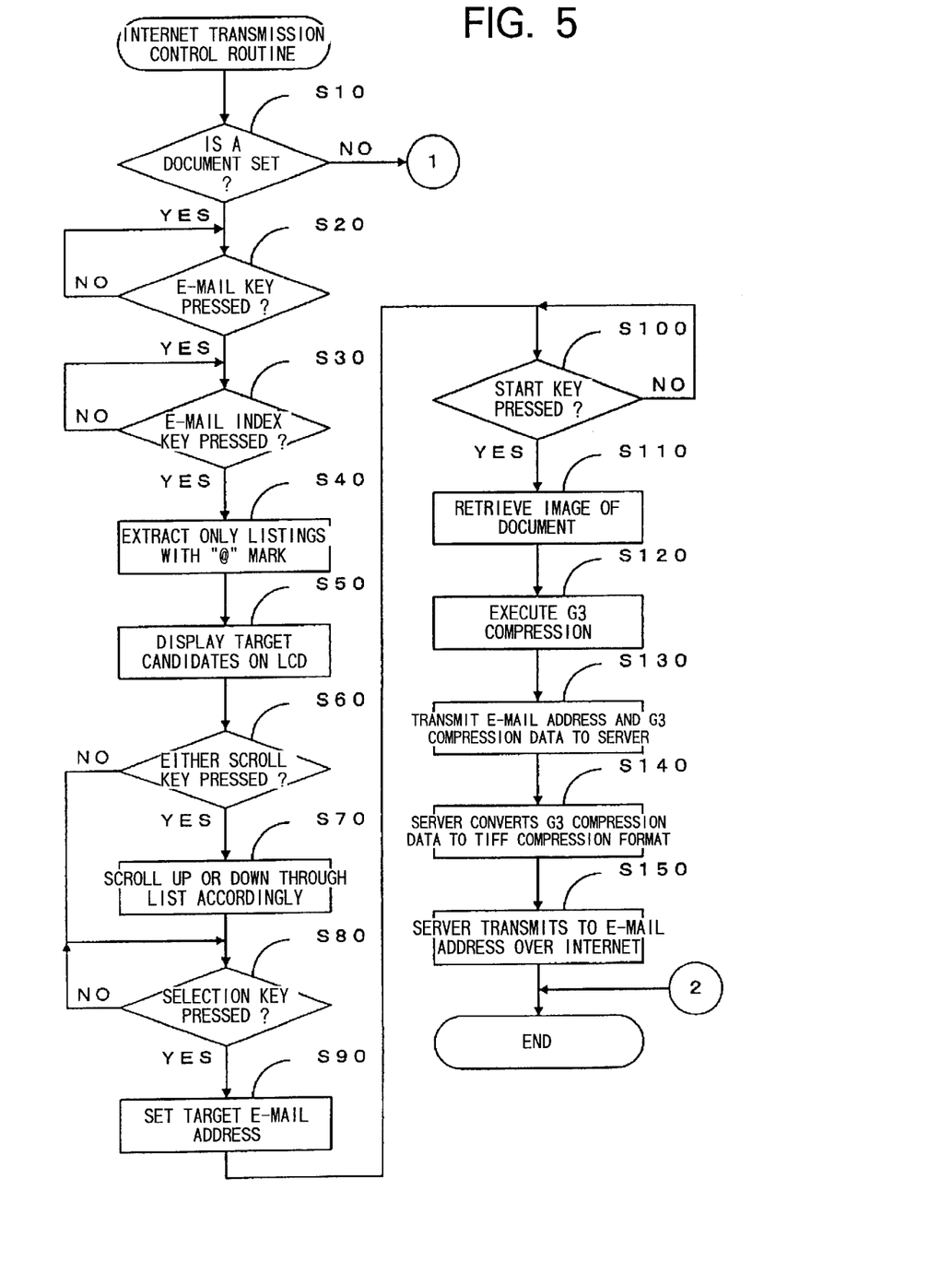
FIG. 5 is a flowchart representing a portion of an Internet communication control routine performed by the system shown in FIG. 1.

When this routine is first started, it is judged in S10 whether or not a document is set in the scanner 10f, based on the document sensor 110f. If a document is set (S10:YES), then in S20 it is judged whether or not the e-mail key 13 has been pressed down. If it is judged that the e-mail key 13 has been pressed down (S20:YES), then in S30 it is judged whether or not the e-mail index key 14 has been pressed down. If the e-mail index key 14 is judged to have been pressed down (S30:YES), then all listings that includes an "@" mark are extracted from the Internet target memory area 10d2 in S40, and displayed on the LCD 11 as target candidates in S50, with the target candidate displayed at the top of the LCD 11 displayed with inverse coloring from the rest. Then in S60 it is judged whether or not the user has operated either of the scroll keys 15, 16. If either of the scroll keys 15, 16 has been operated (S60:YES), then in S70 the target candidates are scrolled up or down according to which scroll key 15, 16 was operated. At this time, whatever target candidate is displayed at the top of the LCD 11 is displayed with inverse coloring from the rest. Next, in S80 it is judged whether or not the selection key 17 has been pressed. If the selection key 17 has been pressed (S80:YES), then in S90 the target candidate displayed in inverse when the selection key 17 was pressed down is set as the target e-mail address. Then, the routine waits in S100 for the start key 18 to be pressed down.

Once the start key is pressed down (S100:YES), then in S110 image data representing the document set in the scanner 10f is retrieved by the scanner 10f. In S120, the encoder/decoder converts the image data into data with G3 compression format. In S130, facsimile transmission procedures are executed to transmit to the server 30 the e-mail address selected S80 and the image data converted into the G3 compression format in S120. Then in S140, the server 30 converts the G3 compression format image data transmitted from the fax machine 10 into data in a Tagged Image File Format (TIFF) compression format that can be transmitted as an e-mail message across the Internet. Then in S150, the server 30 appends the e-mail address transmitted in S130 to the TIFF data as header information, and transmits the TIFF data across the Internet 40 to the e-mail address. As a result, facsimile data is transmitted as an e-mail message to the target location desired by the user.

Figure 6:
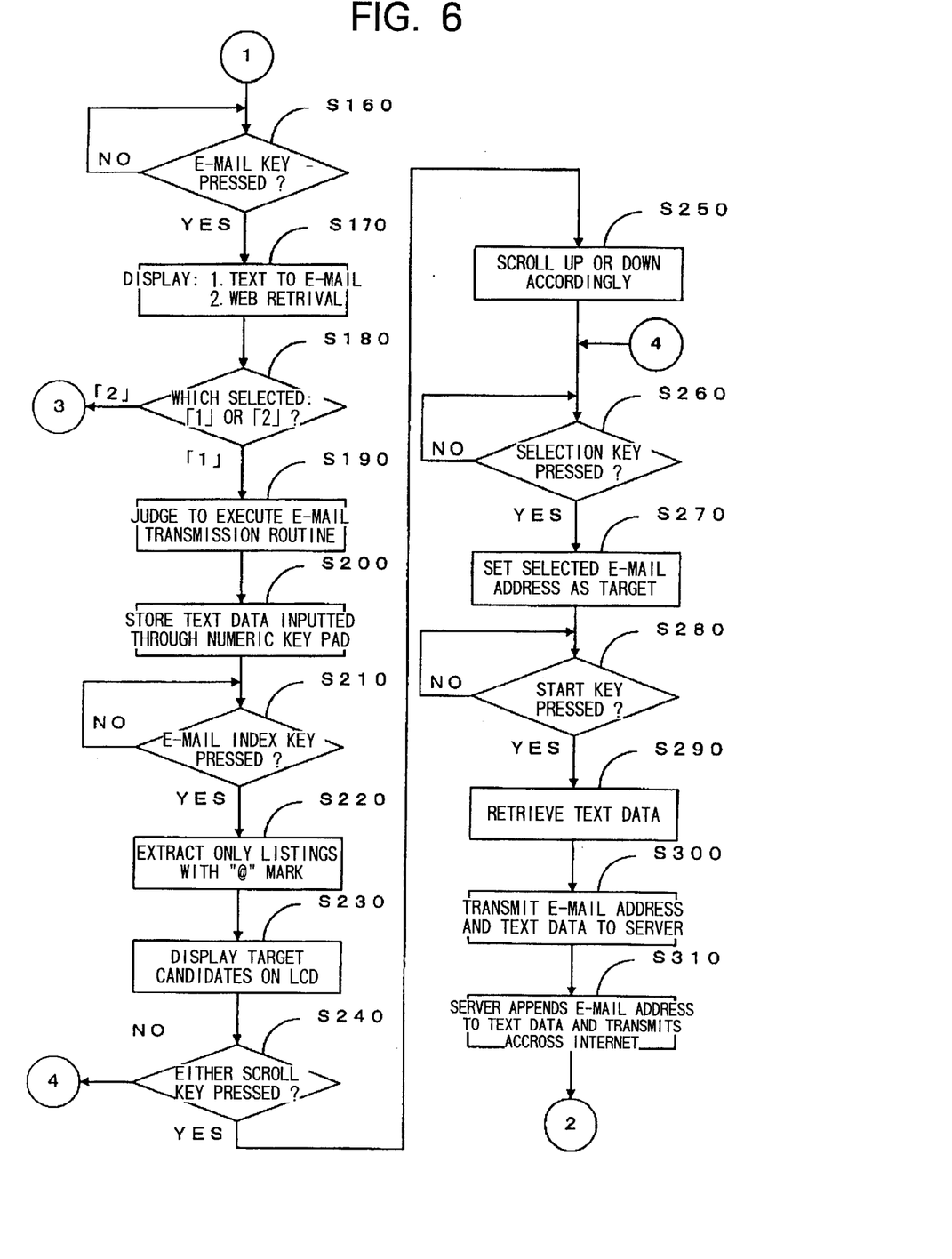
FIG. 6 is a flowchart representing another portion of the Internet communication control routine performed by the system shown in FIG. 1.

On the other hand, when no document is set in the scanner 10f (S10:NO), then in S160 of the flowchart shown in FIG. 6, it is judged whether or not the e-mail key 13 has been pressed. If the e-mail key 13 has been pressed (S160:YES), then in S170, two character trains "1. TEXT TO E-MAIL" and "2. WEB RETRIEVAL" are displayed on the LCD 11. The character train "1. TEXT TO E-MAIL" refers to a routine to be described later that is executed for transmitting e-mail messages. The character train "2. WEB RETRIEVAL" refers to a routine to be described later that is executed for downloading and receiving data from a home page on the WEB.

In S180, it is awaited for the user to operate the numeric key pad 12 to input "1" or "2". If the user presses the "1" key (S180:"1"), then in S190 it is judged that the routine for transmitting e-mail messages is to be performed. Then the user uses the numeric key pad 12 as the character input keys 10e to input text data. In S200, the inputted text data is stored in the RAM 10c. Then, in S210 it is judged whether or not the index key 14 was pressed or not.

If the e-mail index key 14 is judged to have been pressed down (S210:YES), then all listings that include an "@" mark are extracted from the Internet target memory area 10d2 in S220, and displayed on the LCD 11 as target candidates in S230.

Then in S240 it is judged whether or not the user has operated either of the scroll keys 15, 16. If either of the scroll keys 15, 16 has been operated (S240:YES), then in S250 the target candidates are scrolled up or down according to which scroll key 15, 16 was operated. As mentioned previously, the target candidate displayed at the top of the LCD 11 is displayed in inverse. Next, in S260 it is judged whether or not the selection key 17 has been pressed. If the selection key 17 has been pressed (S260:YES), then in S270 the target candidate displayed in inverse when the selection key 17 was pressed down is set as the target e-mail address. Then, the routine waits in S280 for the start key 18 to be pressed down.

Once the start key 18 is pressed down (S280:YES), then in S290 the text data is retrieved from the RAM 10e. In S300, facsimile transmission procedures are executed to transmit to the server 30 the e-mail address selected in S270 and the text data retrieved from the RAM 10e in S300. As a result, in S310 the server 30 appends the e-mail address transmitted from the fax machine 10 as a header to the text data from the fax machine 10, and transmits the text data from the fax machine 10 across the Internet 40. As a result, an e-mail message is transmitted to the target location desired by the user.

Figure 7:
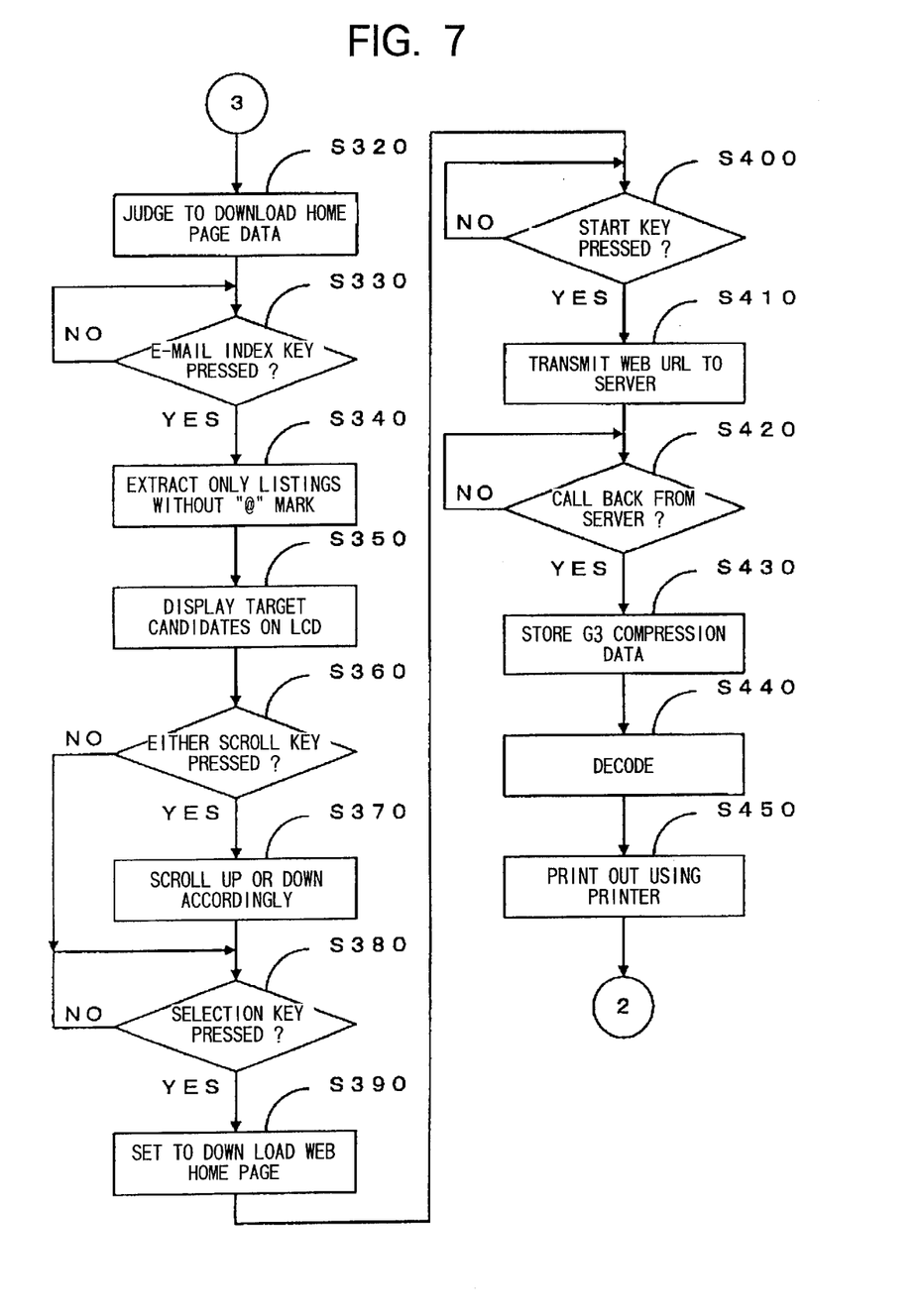
FIG. 7 is a flowchart representing yet another portion of the Internet communication control routine performed by the system shown in FIG. 1.

If in S180 the user operates the numeric key pad to press down the "2" key (S180:"2"), then in S320 it is judged that the routine for downloading and receiving data from a WEB home page desired by the user has been selected. In S330, it is judged whether or not the e-mail index key 14 has been pressed.

If the e-mail index key 14 is judged to have been pressed down (S360:YES), then all listings that do not include an "@" mark are extracted from the Internet target memory area 10d2 of the EEPROM 10d in S340, and displayed on the LCD 11 as target candidates in S350.

Then in S360 it is judged whether or not the user has operated either of the scroll keys 15, 16. If either of the scroll keys 15, 16 has been operated (S360:YES), then in S370 the target candidates are scrolled up or down according to which scroll key 15, 16 was operated. At this time also, the target candidate displayed at the top of the LCD 11 is displayed in inverse. Next, in S380 it is judged whether or not the selection key 17 has been pressed. If the selection key 17 has been pressed (S380:YES), then in S390 the target candidate displayed in inverse when the selection key 17 was pressed down is set as the WEB site from which home page data is to be downloaded and received. Then, the routine waits in S400 for the start key 18 to be pressed down.

Once the start key 18 is pressed (S400:YES), then in S410 facsimile transmission procedures are executed to transmit the URL set in S390 to the server 30. Then in S420, exchange with the server 30 is temporarily terminated, and a call back from the server 30 is awaited.

Figure 8:
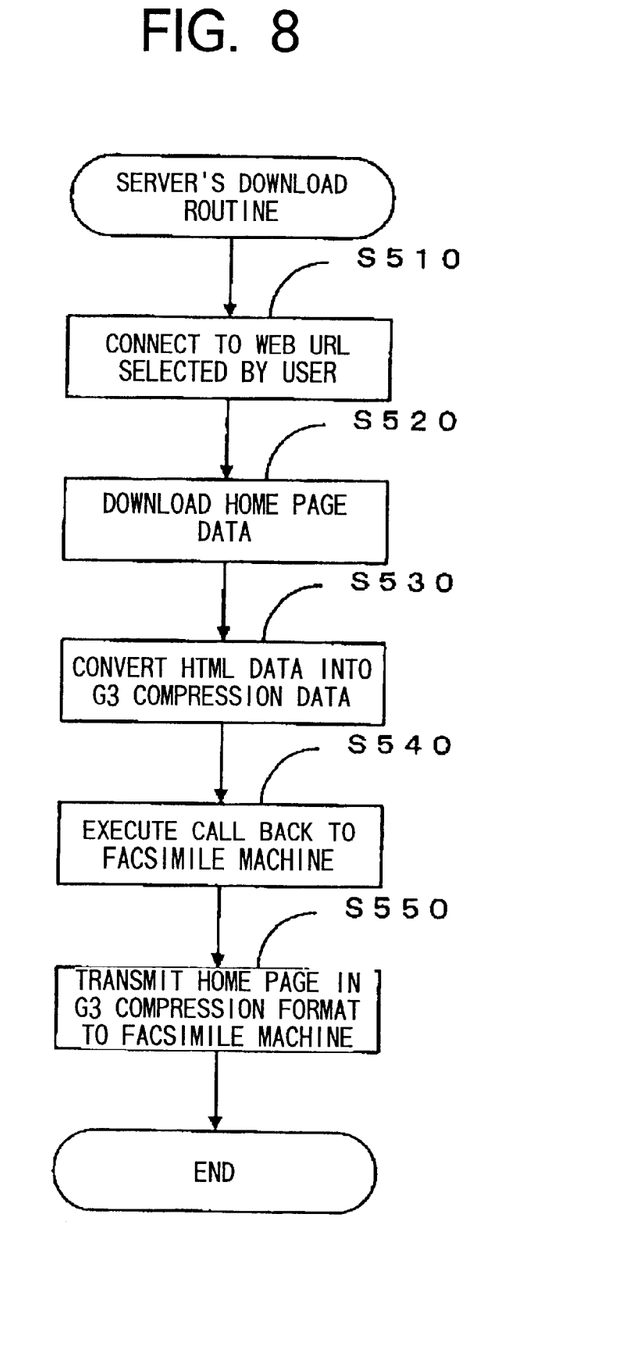
FIG. 8 is a flowchart showing a download routine executed by the server of the system shown in FIG. 1.

As shown of FIG. 8, in S510 the server 30 then connects with the WEB site that corresponds to the URL transmitted from the fax machine 10. Then in S520, the server 30 downloads home page data. In S530, the server converts the home page data from HTML format into G3 compression format. In S540, the server 30 calls back the fax machine 10. In S550, the server 30 transmits the home page data that was converted into G3 compression format to the fax machine 10.

When the fax machine 10 receives a call back from the server 30 (S420:YES), then in S430, the fax machine 10 temporarily stores the image data transmitted from the server 30 in G3 compression format in the RAM 10c. In S440, the fax machine 10 retrieves image data in the G3 compression format from the RAM 10c while the encoder/decoder 10h decodes the image data into a data format that the printer 10g can use to print. In S450, the printer 10g is driven based on the image data to print out images based on the image data. As a result, home page data from a WEB site as desired by the user is downloaded, received, and printed out.

The Internet facsimile communication system according to the present embodiment can transmit facsimile data over the Internet, transmit e-mail data over the Internet, and download home page data from a desired WEB site. Even when the user stores e-mail addresses for transmitting e-mail messages or facsimile data and URLs of WEB sites for downloading home page data in a random order in the EEPROM 10d, the above-described processes extract only e-mail addresses or URLs and display the extracted e-mail addresses or URLs on the LCD 11 as target candidates. Therefore, the user can easily select the processes he or she desires to be executed.

That is, when the user desires to transmit data in the format of an e-mail message to a desired target across the Internet, only e-mail addresses of the items registered in the EEPROM 10d are displayed on the LCD 11 as target candidates. Also, when the user desires to download data from a home page of a desired WEB site, only URLs of the items registered in the EEPROM 10d are displayed on the LCD 11 as target candidates. Therefore, the user will not accidentally select a URL when intending to select an e-mail address or accidentally select an e-mail address when intending to select a URL. Further, the user can easily select the correct target.

Whether or not a listing in the EEPROM 10d is an e-mail address or a URL is judged based on presence or absence of an "@" mark, and target candidates are extracted accordingly. Therefore, target candidates will be displayed without error. Said differently, although both e-mail addresses and URLs are represented using alphanumeric characters, only e-mail addresses include the "@" mark. Furthermore, all e-mail addresses include the "@" mark. The present invention effectively utilizes this characteristic of e-mail addresses. Only a desired one of the set of e-mail addresses or the set of URLs is efficiently extracted from the e-mail addresses and URLs registered in a mixed together condition in the EEPROM 10d, and the members of the set displayed as target candidates on the LCD 11.

When a document is set in the scanner 10f, it is judged that processes are to be performed for transmitting facsimile data to an e-mail address registered in the EEPROM 10d, and it is judged that the user wants to retrieve the image of the document and transmit facsimile data in the form of an e-mail message to a desired target e-mail address across the Internet. Therefore, processes for transmitting facsimile data across the Internet can be reliably performed.

When no document is set in the scanner 10f, and further depending on whether the user wishes to execute "1. TEXT TO MAIL" or "2. WEB RETRIEVAL," then either the e-mail address set or the URL set alone is extracted from the transmission target candidates registered in the EEPROM 10d and displayed on the LCD 11. Therefore, transmission target candidates are displayed in a manner that reflects the user's intentions, so the user can easily select an e-mail address or a URL, depending on the target he or she has in mind.

When the server 30, which is connected to the Internet 40, receives G3 compression data from the fax machine 10, the server 30 converts the G3 compression data into data with an e-mail format and transmits the converted data to the selected e-mail address. On the other hand, when a URL is selected at the fax machine 10 as the communication target, then the server 30 connects to the WEB site that corresponds to the URL, receives download of the home page data from the WEB site, converts the home page data into G3 compression data, and calls back the fax machine 10. As result, the fax machine 10 both transmits and receives G3 compression data. That is, on the one hand, the fax machine 10 can transmit G3 compression data to a desired target across the Internet without converting the G3 compression data from text data that can be transmitted as an e-mail message into image data. On the other hand, the fax machine 10 can download and print out home page data from a desired WEB site without performing processes for converting HTML data into G3 compression data. As a result, the fax machine 10 can have substantially the same configuration as a conventional fax machine, because it can perform processes using an inexpensive FAX modem 10i, without need of a data modem. A data modem supports a protocol for transmitting data, but not a protocol for transmitting facsimile messages. On the other hand, a fax modem can only performed facsimile transmissions. A fax modem is incapable of connecting with an Internet provider and performing two-way transmission, and so is much less expensive that a data modem.

It should be noted that the fax machine 10 according to the present embodiment can transmit normal facsimile data using a public line.

While the invention has been described in detail with reference to specific embodiments thereof, it would be apparent to those skilled in the art that various changes and modifications may be made therein without departing from the spirit of the invention, the scope of which is defined by the attached claims.

What is claimed is:

1. An Internet communication system for communicating data over the Internet, the Internet communication system comprising:

a target register registered with e-mail addresses and URLs as targets of data communication over the Internet;

an Internet command unit that commands data communication over the Internet;

a judgment unit that, when the Internet command unit commands data communication over the Internet, judges whether data is to be transmitted to one of the e-mail addresses registered in the target register or home page data located at one of the URLs registered in the target register is to be downloaded and received;

a target candidate display unit that:

extracts only e-mail addresses from the target register and displays a list of the extracted e-mail addresses as target candidates when the judgment unit judges that data is to be transmitted to one of the e-mail addresses registered in the target register; and extracts only URLs from the target register and displays a list of the extracted URLs as target candidates when the judgment unit judges that home page data located at one of the URLs registered in the target register is to be downloaded and received; and a selection unit that selects a desired e-mail address or URL from the displayed target candidates.

2. An Internet communication system as claimed in claim 1, wherein the target candidate display unit judges whether targets registered in the target register are e-mail addresses or URLs, based on presence or absence of an "@" mark.

3. An Internet communication system as claimed in claim 1, further comprising a document retrieval unit for retrieving an image of a document, and wherein the judgment unit judges:

whether a document is set in the document retrieval unit; and that data should be transmitted to one of the e-mail addresses registered in the target register when the Internet command unit commands communication of data over the Internet while a document is set in the document retrieval unit.

4. An Internet communication system as claimed in claim 3, wherein:

the Internet command unit includes a process content command unit that, when the judgment unit judges that a document is not set in the document retrieval unit, commands either to transmit e-mail data to one of the e-mail addresses registered in the target register or to download and receive home page data located at one of the URLs registered in the target register; and the judgment unit judges according to the command from the process content command unit.

5. An Internet communication system as claimed in claim 1, further comprising:

a server connected to the Internet; and a facsimile device that connects to the server by a public line when the Internet command unit commands data communication over the Internet, and that transmits G3 data to the server over the Internet when the candidate selection unit selects an e-mail address;

wherein the server:

when the candidate selection unit selects an e-mail address, converts G3 data from the facsimile device into data with an e-mail format and transmits the data with the e-mail format to the e-mail address selected by the candidate selection unit; and when the candidate selection unit selects a URL, connects to a WEB site that corresponds to the URL, downloads and receives home page data located at the WEB site, converts the home page data into G3 data, and transmits the G3 data to the facsimile device.

6. An Internet communication system for communicating data over the Internet, the Internet communication system comprising:

a target register registered with e-mail addresses and URLs as targets of data communication over the Internet;

an e-mail command unit that commands transmission of data to one of the e-mail addresses registered in the target register;

a homepage data download command unit that commands downloading and reception of home page data located at one of the URLs registered in the target register;

a target candidate display unit that:
extracts only e-mail addresses from the target register and displays a list of the extracted e-mail addresses as target candidates when the e-mail command unit commands transmission of data to one of the e-mail addresses registered in the target register; and extracts only URLs from the target register and displays a list of the extracted URLs as target candidates when the homepage data download command unit commands downloading and reception of home page data located at one of the URLs registered in the target register; and a selection unit that selects a desired e-mail address or URL from the displayed target candidates.

* * * * *